(12) United States Patent
Lentine et al.

(10) Patent No.: US 10,788,689 B1
(45) Date of Patent: Sep. 29, 2020

(54) HETEROGENEOUSLY INTEGRATED ELECTRO-OPTIC MODULATOR

(71) Applicant: National Technology & Engineering Solutions of Sandia, LLC, Albuquerque, NM (US)

(72) Inventors: Anthony L. Lentine, Albuquerque, NM (US); Christopher DeRose, Victor, NY (US); Douglas Chandler Trotter, Albuquerque, NM (US); Thomas A. Friedmann, Albuquerque, NM (US); Michael Gehl, Albuquerque, NM (US); Nicholas Boynton, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/656,922

(22) Filed: Oct. 18, 2019

(51) Int. Cl.
G02F 1/035 (2006.01)
G02F 1/225 (2006.01)
G02F 1/21 (2006.01)

(52) U.S. Cl.
CPC .......... *G02F 1/0356* (2013.01); *G02F 1/2255* (2013.01); *G02F 2001/212* (2013.01); *G02F 2202/20* (2013.01)

(58) Field of Classification Search
CPC ............. G02F 1/2255; G02F 2001/212; G02F 1/0356; G02F 2202/20
See application file for complete search history.

(56) References Cited

U.S. PATENT DOCUMENTS

| | | | |
|---|---|---|---|
| 5,699,465 A * | 12/1997 | Nakaya | G02F 1/3132 385/16 |
| 7,616,850 B1 * | 11/2009 | Watts | G02B 6/29335 385/2 |
| 8,064,490 B2 * | 11/2011 | Okayama | G02B 6/29355 372/20 |
| 9,419,412 B2 * | 8/2016 | Krishnamurthy | H01S 5/06255 |
| 2004/0037497 A1 * | 2/2004 | Lee | G02B 6/1228 385/28 |
| 2008/0069491 A1 * | 3/2008 | Kissa | G02F 1/2255 385/2 |
| 2013/0039612 A1 * | 2/2013 | Sugiyama | G02F 1/0356 385/3 |
| 2014/0294341 A1 * | 10/2014 | Hatori | G02B 6/12 385/14 |

OTHER PUBLICATIONS

Alferness, R. C. et al., "Velocity-Matching Techniques for Integrated Optic Traveling Wave Switch/Modulators," IEEE Journal of Quantum Electronics (1984) 20(3):301-309.

(Continued)

*Primary Examiner* — Sung H Pak
(74) *Attorney, Agent, or Firm* — Martin I. Finston

(57) ABSTRACT

In an electro-optical modulator, an electro-optical modulation layer is bonded to a cladding layer that overlies a substrate. A modulation zone waveguide is optically coupled to the electro-optical modulation layer and optically coupled to an I/O waveguiding structure embedded in the cladding layer. The I/O waveguiding structure is conformed to guide input light toward the modulation zone waveguide and to guide output light away from the modulation zone waveguide.

20 Claims, 8 Drawing Sheets

(56) References Cited

OTHER PUBLICATIONS

Blumenthal, D. J. et al., "Silicon Nitride in Silicon Photonics," Proceedings of the IEEE (2018) 106(12):2209-2231.

Chang. L. et al., "Heterogeneous integration of lithium niobate and silicon nitride waveguides for wafer-scale photonic integrated circuits on silicon," Optics Letters (2017) 42(4):803-806.

Douglas, E. A. et al., "Effect of precursors on propagation loss for plasma-enhanced chemical vapor deposition of SiNx:H waveguides," Optical Materials Expression (2016) 6(9):2892-2903.

Jin, S. et al., "LiNbO3 Thin-Film Modulators Using Silicon Nitride Surface Ridge Waveguides," IEEE Photonics Technology Letters (2016) 28(7):736-739.

Lentine, A. L. et al., "Silicon Photonics Platform for National Security Applications," IEEE Aerospace Conference (2015) 9 pages.

Marpaung, D. et al., "Integrated microwave photonics," Laser Photonics Rev. (2013) 7(4):506-538.

Mercante, A. J. et al., "Thin film lithium niobate electro-optic modulator with terahertz operating bandwith," Optics Express (2018) 26(11):14810-14816.

Rao, A. et al., "High-performance and linear thin-film lithium niobate Mach-Zehnder modulators on silicon up to 50 GHz," Optics Letters (2016) 41(24):5700-5703.

Thorlabs Specification Sheet, "40 GHz Lithium Niobate Intensity Modulator," https://www.thorlabs.com/drawings/399a13a87fd14e2b-8F18938B-EBE2-8F2D-58F97ECBB51E3CF2/LN05S-FC-SpecSheet.pdf, Aug. 2, 2018, 2 pages.

Wang, C. et al., "Integrated lithium niobate electro-optic modulators operating at CMOS-compatible voltages," Nature (2018) 562:101-104.

Weigel, P. O. et al., "Bonded thin film lithium niobate modulator on a silicon photonics platform exceeding 100 GHz 3-dB electrical modulation bandwith," Optics Express (2018) 26(18):23728-23739.

Wooten, E. L. et al., "A Review of Lithium Niobate Modulators for Fiber-Optic Communications Systems," IEEE Journal of Selected Topics in Quantum Electronics (2000) 6(1):69-82.

\* cited by examiner

HETEROGENEOUSLY INTEGRATED ELECTRO-OPTIC MODULATOR

STATEMENT OF GOVERNMENT RIGHTS

This invention was made with United States Government support under Contract No. DE-NA0003525 between National Technology & Engineering Solutions of Sandia, LLC and the United States Department of Energy/National Nuclear Security Administration. The United States Government has certain rights in this invention.

TECHNICAL FIELD

This invention relates to optical modulators, and more particularly to electro-optic modulators utilizing materials such as lithium niobate that have high electro-optic coefficients.

BACKGROUND OF THE INVENTION

It has been a longstanding practice in modern telecommunications and signal processing to transmit information on optical carriers propagating in an optical fiber or other optical waveguide. Various technologies are available for modulating the information onto an optical carrier. As data rates have increased into the gigahertz range, however, attention has turned toward those technologies that offer, or potentially offer, the highest modulation rates.

One type of modulator that can potentially offer modulation rates of ten gigahertz or more is the electro-optic modulator (EOM). In an EOM, a time-varying voltage is applied across a waveguide that comprises a material having a large electro-optic coefficient. In such a material, the applied voltage changes the refractive index of the material, and hence also changes the propagation velocity of a guided optical wave within the material. This property is used to modulate the phase of a guided optical carrier wave.

Interference effects can be used to convert the phase modulation to amplitude modulation. This is often done by combining a phase-modulated signal in one arm of a Mach-Zehnder interferometer (MZI) with an unmodulated or oppositely modulated signal in the other arm of the MZI. Other possible geometries include resonators that go in and out of resonance as the phase delay in a portion of the resonator is changed. These may be implemented, for example, as ring resonators, racetrack resonators, or Fabry-Perot resonators.

Silicon is a useful material for photonics. In a typical silicon photonics (SIP) EOM, a voltage signal is applied to a diode structure incorporated in the waveguide. The diode structure responds with changes in free carrier concentration, with resulting changes in the refractive index.

Silicon-based EOMs are highly advantageous because they can be fabricated using CMOS-compatible technology and because they can be readily integrated into SIP platforms containing circuitry for a wide variety of applications. However, the speed of these devices is limited. In general, they would not be the first choice for applications requiring a 3-dB electrical modulation bandwidth greater than 50 GHz. Silicon-based modulators are also limited in the optical power that they can support, because they are susceptible to two-photon absorption processes that lead to nonlinear effects.

Lithium niobate (LN) is an alternative electro-optic (EO) material that can potentially offer greater modulation bandwidth. Because LN has a very high electro-optic coefficient, it can provide effective modulation at relatively low voltages applied over relatively short distances. An important figure of merit in this regard is $V_\pi L$, defined as the product of applied voltage times modulation length required to achieve a phase shift of 180°. For LN-based modulators, reported values of $V_\pi L$ generally fall in the range 1-25 V-cm.

It would be advantageous to combine LN-based modulation with the convenience and versatility of a SIP platform. In practice, however, this has proven difficult because the technology for LN processing is incompatible with CMOS processing. This has required LN-based devices and SIP devices to be manufactured in different plants.

Certain advances in heterogeneous integration have helped to alleviate this problem. ("Heterogeneous integration" or "heterointegration" is the technology of combining separately manufactured components on a single chip, where they have complementary functions in the functionality of the chip as a whole.)

For example, Peter O. Weigel et al., "Lightwave Circuits in Lithium Niobate through Hybrid Waveguides with Silicon Photonics," *Nature Scientific Reports* (Mar. 1, 2016), 6:22301 DOI: 10.1038/srep22301, hereinafter cited as "Weigel (2016)", reported a photonic waveguide technology based on a two-material core, in which a submicrometer-thickness patterned layer of silicon is bonded to a submicrometer-thickness layer of unpatterned, single-crystalline, thin-film LN (TFLN), and light is coupled between the two layers.

Further progress was reported in Peter O. Weigel et al., "Bonded thin film lithium niobate modulator on a silicon photonics platform exceeding 100 GHz 3-dB electrical modulation bandwidth," *Optics Express* 26 (Sep. 3, 2018) 23728-23739, hereinafter cited as "Weigel (2018)". There, the authors reported a Mach-Zehnder EOM in which unpatterned TFLN was oxide-bonded at 200° C. to a SIP platform that included features for optical input/output, directional coupling, and curvilinear routing. The 3-dB electrical modulation bandwidth reported for the resulting hybrid device was greater than 106 GHz.

The entirety of Weigel (2016) and the entirety of Weigel (2018) are hereby incorporated herein by reference.

The Weigel (2018) paper marks an important direction for future development of hybrid EO modulators. One of the remaining challenges is to make the designs of the hybrid devices even more amenable to heterointegration without substantially sacrificing the potential gains in modulation bandwidth.

SUMMARY OF THE INVENTION

We have developed a new and improved heterointegrated EOM in which an unpatterned, thin LN film is bonded to a SIP platform. A prototype of our new EOM achieved a 3-dB electro-optic bandwidth of about 30 GHz and a $V_\pi L$ of about 6.7 V-cm.

In embodiments, the invention relates to an EOM for at least one operating wavelength, in which a silicon-based component is bonded to an EO component. The silicon-based component comprises a substrate, a cladding layer overlying the substrate, and at least one vertically coupled waveguide structure, at least part of which is embedded in the cladding layer.

The EO component is also referred to below as the "EO modulation layer". The EO component comprises a film of EO material. In examples, the EO component is thin film lithium niobate (TFLN) less than 1 μm thick. More typically, the TFLN thickness for this application will be less than 1 µm, and a typical thickness will be, e.g., 200 nm.

The lithium niobate film can be diced from a TFLN wafer and bonded to the silicon-based component without any need to etch the lithium niobate.

The vertically coupled waveguide structure comprises a modulation zone waveguide, which in embodiments is an upper waveguide, situated within an optical coupling distance of the EO film. The vertically coupled waveguide structure further comprises an I/O waveguiding structure, which in embodiments is constituted by lower input and output waveguides. The EO film is closer to the modulation zone waveguide, and farther from the I/O waveguiding structure, so that there is less interaction between the EO film and the I/O waveguiding structure.

Accordingly, the invention in various embodiments involves an electro-optical modulator apparatus, comprising a substrate, a cladding layer that overlies the substrate, an EO modulation layer bonded to the cladding layer, a modulation zone waveguide optically coupled to the EO modulation layer, and an I/O waveguiding structure embedded in the cladding layer. The I/O waveguiding structure lies at a separation from the EO modulation layer such that the EO modulation layer is nearer to the modulation zone waveguide than it is to the I/O waveguiding structure. The I/O waveguiding structure is conformed to guide input light toward the modulation zone waveguide and to guide output light away from the modulation zone waveguide.

In embodiments, waveguide tapers are used to optically couple the modulation zone waveguide to the I/O waveguiding structure.

In embodiments, the I/O waveguiding structure is constituted by lower input and output waveguides that are situated more deeply within the cladding layer than the upper (modulation zone) waveguide, and they are vertically coupled to the upper waveguide.

In embodiments, the upper (modulation zone) waveguide and the lower input and output waveguides are conformed as single-mode waveguides at the operating wavelength.

In embodiments, the upper (modulation zone) waveguide and the lower input and output waveguides are incorporated in an arm of an MZM. Some embodiments include a first and a second vertically coupled waveguide structure, each of which is incorporated in a respective arm of an MZM.

In embodiments, the EOM further comprises radio-frequency electrodes embedded in the cladding layer and electromagnetically coupled to the EO modulation layer. In this regard, the term "radio-frequency" should be understood in a broad sense that includes microwave frequencies. In general, suitable radio frequencies may fall anywhere within the range 100 kHz to 100 GHz and may even fall outside that range.

In embodiments, the silicon-based component is formed in a SOI wafer.

In embodiments, the cladding layer comprises silicon dioxide.

In embodiments, the EO film comprises lithium niobate.

In embodiments, the EO film is oxide-bonded directly to the cladding layer.

In embodiments, the vertical coupling between the upper waveguide and the lower input and output waveguides is effectuated by adiabatic tapers defined in end portions of the lower input and output waveguides and the upper waveguide.

In embodiments, the silicon-based component includes a silicon device layer containing one or more active electronic devices.

In embodiments, the lower input and output waveguides and the upper (modulation zone) waveguide are silicon nitride waveguides.

DETAILED DESCRIPTION

In an example embodiment, an opto-electronic modulator (OEM) is realized by defining a Mach-Zehnder modulator (MZM) in a silicon photonics (SIP) platform and bonding a thin film of lithium niobate (LN) to the top surface (i.e., the surface opposite to the substrate) of the SIP platform. The LN film is optically coupled to the arms of the MZM in a manner to be described below. The LN film is also electromagnetically coupled to an arrangement of traveling wave radio-frequency (RF) electrodes. By action of the Pockels effect in LN, the electric field applied by the RF electrodes modulates the phase of the optical carrier propagating in the arms of the MZM. Due to the phase modulation, the recombined optical carrier exits the output end of the MZM as an amplitude modulated signal.

Figure 1:
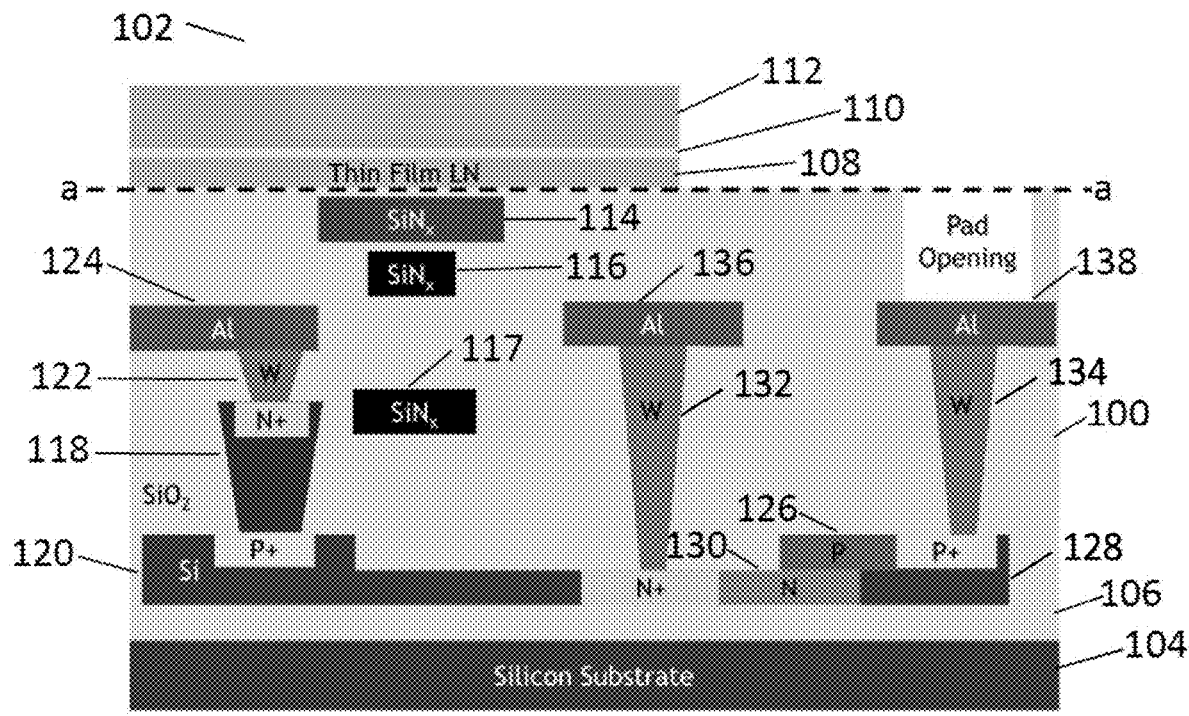
FIG. 1 is a notional cross-sectional view of an example OEM device of the kind described here.

FIG. 1 provides a notional cross-sectional view of an example device. The portion of the device below line a-a is the SIP component 100, and the portion above line a-a is the EO component 102. In the figure, the SIP component includes silicon substrate 104 and cladding layer 106 of silicon dioxide. (In this regard, any oxide of silicon suitable for a dielectric layer is referred to as "silicon dioxide" irrespective of its precise stoichiometry.) The EO component 102 includes the lithium niobate thin film 108.

The lithium niobate thin film is conveniently provided in the form of a lithium-niobate-on-insulator (LNOI) wafer. For example, suitable 75-mm wafers are commercially available from NanoLN.com, Jinan Jingzheng Electronics Co., Ltd. In those wafers, a 2-µm layer of silicon dioxide separates a silicon handle from an x-cut LN film.

FIG. 1 shows the LN film 108 as a layer on a wafer that also includes insulator layer 110 of silicon dioxide and handle layer 112 of silicon.

Lithium niobate is our currently preferred EO medium. However, other EO materials are known. Any of various EO materials could be useful in the present context, provided they can be deposited on a silicon dioxide surface. Materials that are suitable in this regard include various electro-optic polymers, lithium tantalate, potassium titanyl phosphate (KTP), and various electro-optic compounds.

With further reference to the SIP component 100, the illustrative example includes upper silicon nitride waveguide 114 and lower silicon nitride waveguides 116. As will be explained in more detail below, upper waveguide 114 is formed within an optical coupling distance of LN thin film 108.

Silicon is an alternative waveguide material that may be used instead of silicon nitride (SiN). However, SiN is currently preferred because it offers several advantages over silicon. One advantage is that SiN is much less susceptible than silicon to two-photon absorption processes. Consequently, SiN is free of undesirable nonlinear optical effects that occur due to two-photon absorption in silicon at high power levels. Another advantage is that SiN permits operation at wavelengths below 1.100 µm, which fall within a silicon absorption band.

Yet another advantage is that in fabrication, it may be desirable to form buried metal electrodes that are overlain by a silicon dioxide layer, and then to deposit the waveguide material on the silicon dioxide. SiN can be suitably grown on the silicon dioxide layer. However, it is not feasible to grow high quality crystalline silicon on such a silicon dioxide layer. At best, amorphous or polycrystalline silicon can be grown, but it will exhibit relatively high optical loss.

Turning again to FIG. 1, it will be seen that in the view of the figure, only one of the lower waveguides 116 is visible. However, as will be seen below, the lower waveguide structure includes an input waveguide and an output waveguide, each of which is optically coupled to the upper waveguide 114. Moreover, as will also be explained below, the example device contains two instances of the upper waveguide 114, and each instance is optically coupled to its own lower input and lower output waveguides. Each waveguide structure consisting of an upper waveguide and two lower input/output waveguides is incorporated in a respective arm of an MZM.

With further reference to FIG. 1, it will be seen that silicon photonic (SIP) circuitry for signal processing and detection can be included within the SIP component 100. In the specific example that is illustrated, one or more waveguides 117, which may, for example, be silicon nitride waveguides, are provided for input and output of optical signals.

FIG. 1 includes depictions of two EO devices as non-limiting examples: A germanium diode detector and a silicon EO modulator. It should be noted that the representation of these devices is notional; it is provided to illustrate some of the capabilities of the layered structure that is depicted, but it is not intended to be realistic in its details. Thus, for example, the figure does not distinguish between aluminum RF electrodes and aluminum contacts for the SIP devices. In practice, such electrodes and such contacts may be fabricated in the same metallization layer, but they would be formed as distinct features.

With further reference to FIG. 1, the diode detector includes germanium absorber 118, silicon waveguiding portion 120, which as shown includes a p+ collector portion, tungsten via 122, and aluminum interconnect 124.

Another example device seen in the figure is a silicon EO modulator. The silicon modulator includes p-type portion 126, intrinsic silicon waveguiding portion 128, n-type portion 130, tungsten vias 132, 134, and aluminum interconnects 136, 138.

In examples, the aluminum metallization referred to above is aluminum metallization according to conventional CMOS techniques. As those skilled in the art will recognize, metallization layers of that kind may include, e.g., a Ti/TiN diffusion barrier.

From a practical standpoint, an important feature of the architecture of FIG. 1 is that up to the bonding of EO component 102, the device can be entirely fabricated in a CMOS manufacturing plant. Further, the expense of etching the LN film can be avoided. It is sufficient to simply cut an off-the-shelf wafer to size and bond the thin-film lithium niobate (TFLN) portion of the wafer to cladding layer 106 by a process such as the process described below. Optionally, the substrate on which the TFLN has been deposited can be removed in a post-process.

Figure 2:
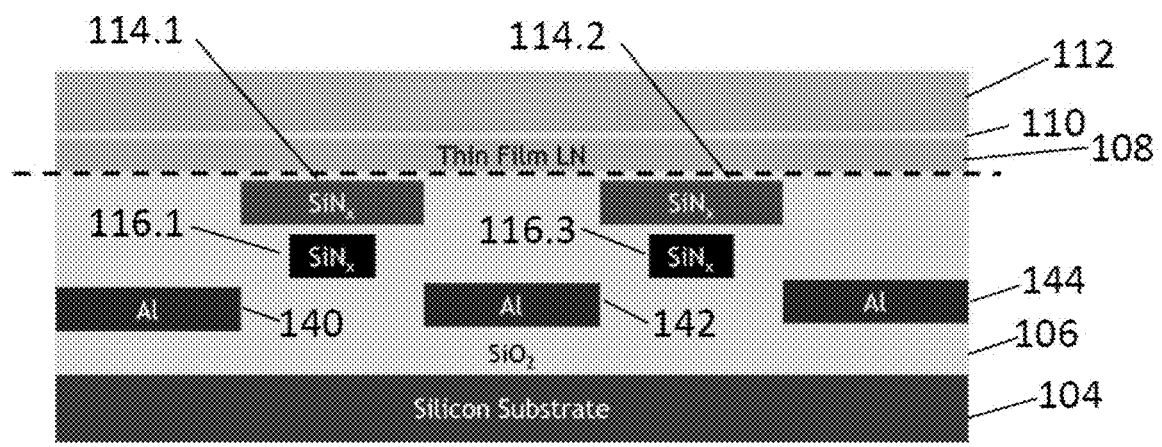
FIG. 2 is a notional cross-section similar to FIG. 1 but omitting certain details and adding others.

FIG. 2 is a notional cross-section similar to FIG. 1 but omitting the SIP circuitry and offering more details of the EOM. Repeated figure elements are called out with like reference numerals in FIG. 2 and subsequent figures.

FIG. 2 shows two upper waveguides 114.1 and 114.2 and two lower waveguides 116.1 and 116.3. The upper waveguides are situated within an optical coupling distance of the LN film 108 so that in use, a portion of the guided mode in the upper waveguides is captured and confined within the LN film. The lower waveguides are situated more deeply within the cladding layer 106 than are the upper waveguides.

Because the lower waveguides are relatively far from the LN film, they exhibit relatively little crosstalk with it. Optical loss due to crosstalk may be as low as 0.25 dB or even less at the operating wavelength. However, each lower waveguide is optically coupled to the upper waveguide that overlies it, through a vertical coupling to be described below.

There are discontinuities in the effective refractive index at the LN-air interfaces at the entry-side and exit-side edges of the LN film. Even though the lower waveguides are relatively far from the LN film, it is possible for these discontinuities to give rise to reflection loss, for example from reflections entering the EO modulation layer. We have implemented design features to mitigate this reflection loss, as described below.

In the example illustrated here, the waveguiding arrangement that includes waveguides 114.1 and 116.1 is incorporated in one arm of an MZM, and the waveguiding arrangement that includes waveguides 114.2 and 116.3 is incorporated in the other arm of the MZM.

The figure shows three aluminum electrodes 140, 142, 144 buried in cladding layer 106. The electrodes are in a ground-signal-ground configuration, with electrodes 140 and 144 connected to ground and electrode 142 driven by an external circuit (not shown).

As shown in the figure, the three aluminum electrodes lie at a greater depth within the cladding layer than the lower waveguides. In alternative arrangements, the position of the electrodes may be shifted upward. For example, aluminum waveguides may be fabricated at shallower depths within the cladding layer through the use of a damascene process.

Within the LN film, the applied RF electric field has a spatially varying x-component $E_x$, i.e., the component parallel to the LN film and perpendicular to the waveguide propagation axis. The electrodes and waveguides are arranged so that during operation, when $E_x$ is positive in direction in the modal capture portion of the LN film above one of the two upper waveguides, it is negative in direction above the other upper waveguide. As a consequence, the electro-optic shift in refractive index is such that the index is increased in the region above one upper waveguide and decreased in the region above the other. If, e.g., a sinusoidal RF waveform is applied, the respective regions of increased and decreased index will exchange places in each successive half-cycle.

Each upper waveguide interacts with the LN film above it in such a way as to effectively form a hybrid waveguide with properties influenced by the LN film. Consequently, when the refractive index of the LN film is shifted, the effective index of the hybrid waveguide is shifted in the same direction. This makes it possible to operate the MZM in a push-pull configuration, in which while one arm is experiencing an increase in refractive index, the other arm is experiencing a decrease.

As noted above, the position of the RF electrodes shown in FIG. 2 is only one non-limiting example. In alternate embodiments, the RF electrodes may be deposited over cladding layer 106, and in some cases, it may even be deposited over the LN film. Such embodiments are not excluded from the scope of the present invention.

RF electrodes that overlie, rather than underlie, the optical waveguides are preferred in the prior art because they are believed more effective in delivering a strong $E_x$ to the LN film. We made the surprising discovery, however, that the RF electrodes could be buried beneath the waveguides without incurring a prohibitive cost in performance metrics.

Burying the RF electrodes within the cladding layer is highly advantageous from the standpoint of fabrication. That is because a nearly complete workpiece can be made solely within a CMOS facility. The only further processing that is required is attachment of the LN film. (If the LN film is attached while it is still on, e.g., a die from a LNOI wafer, there is also optional further processing to remove the substrate and insulator portions of the LNOI die.)

Figure 3:
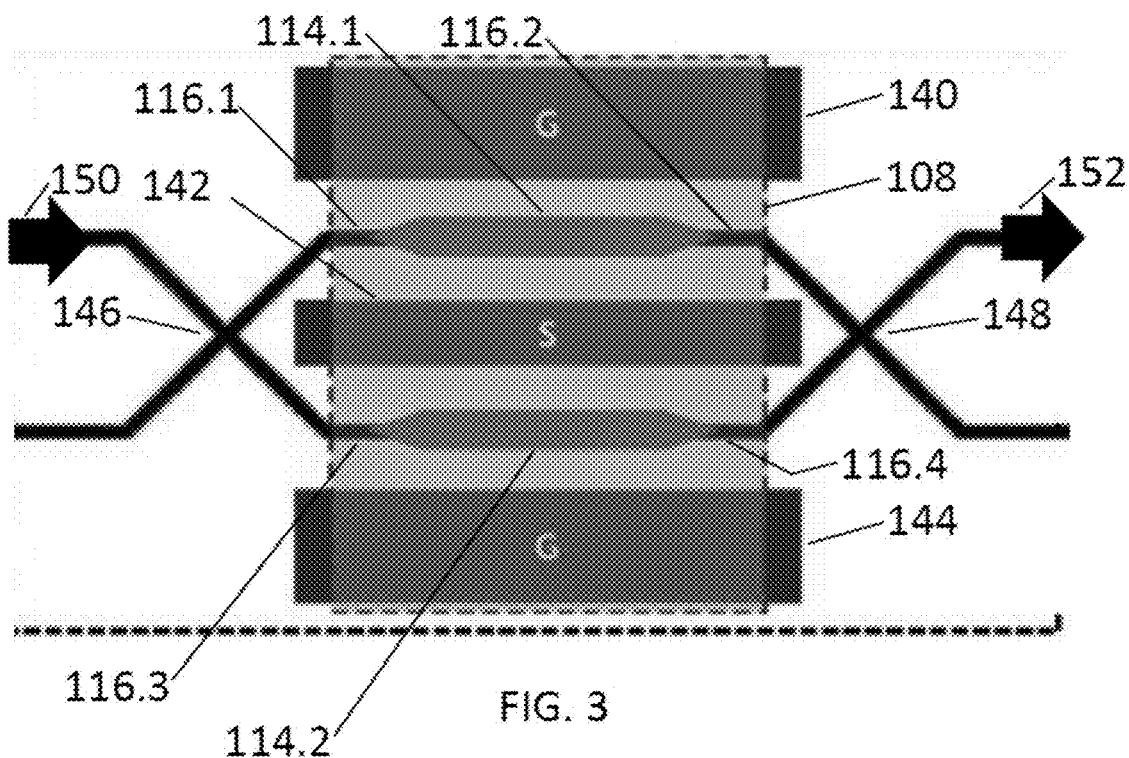
FIG. 3 is a notional plan view of the EOM of the preceding figures.

FIG. 3 is a notional plan view of the EOM of the preceding figure. The two RF ground electrodes 140, 144 and the RF signal electrode 142 are seen to extend parallel to upper waveguides 114.1, 114.2. Upper waveguide 114.1 is shown as coupled to lower waveguide 116.1, which could serve, e.g., as an input waveguide, and to lower waveguide 116.2, which could serve, e.g., as an output waveguide for the modulation region. Similarly, upper waveguide 114.2 is shown as coupled to lower waveguide 116.3, which could serve, e.g., as an input waveguide, and to lower waveguide 116.4, which could serve, e.g., as an output waveguide for the modulation region.

A pair of 2×2 3-dB couplers 146, 148 are used to split and recombine the respective optical paths through the MZM. The couplers may be implemented, e.g., as multimode interference (MMI) splitters. By way of example, the optical input to the MZM may be injected at port 150, as indicated in the figure, and the optical output may be extracted from port 152, as also indicated in the figure.

With further reference to FIG. 3, it will be seen that LN film 108 overlies the RF electrodes, the upper waveguides, and portions of the lower waveguides. (In this regard, we refer to an upper-level feature as "overlying" a lower-level feature even if the lower-level feature is only partially overlain.) For simplified presentation, the RF signal electrode is not shown in the figure.

As will be explained in greater detail below, there is a vertical coupling between an end of each of the lower input and output waveguides and an end of the associated upper waveguide. For that purpose, each of the coupled ends is advantageously conformed with an adiabatic taper. It is desirable for the taper to be adiabatic so that a single mode signal propagating in an input waveguide will remain single mode when it is coupled into the upper waveguide, and likewise, so that a single mode signal coupled out of the upper waveguide will remain single mode in the output waveguide.

Figure 4:
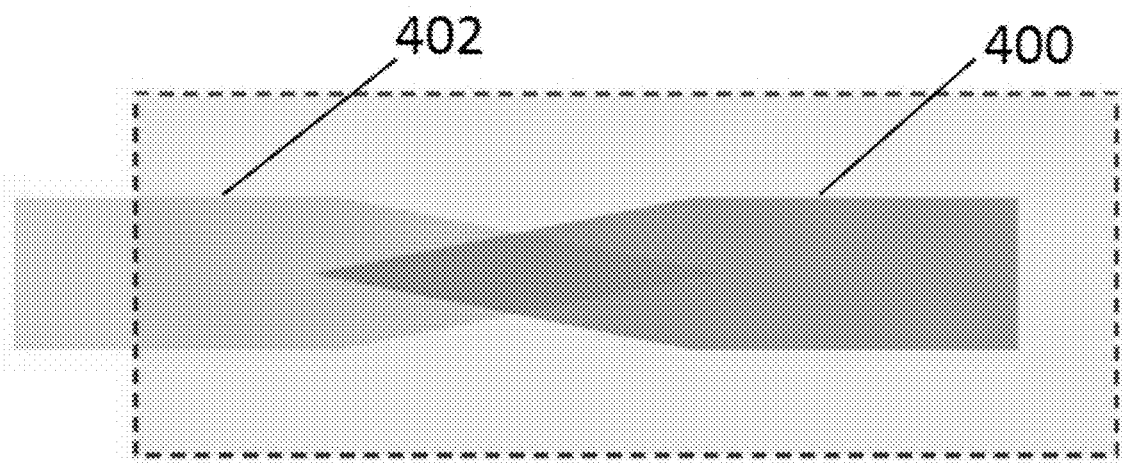
FIG. 4 is a notional diagram illustrating a vertical optical coupling effectuated by two overlapping tapers defined in the ends of respective waveguides.

The vertical coupling is effectuated by positioning the upper-level tapers over the lower-level tapers to which they are coupled. Such a coupling is illustrated in FIG. 4, in which upper-level taper 400 is seen to overlie lower-level taper 402. The taper as illustrated is a linear taper. However, other shapes, such as exponential shapes, are also believed to be effective.

We devised the two-level waveguide arrangement with vertical coupling to suppress reflections from the discontinuity in effective refractive index at the LN-air interfaces at the entry-side and exit-side edges of the LN film. For this measure to be effective, we found that the LN film needed to cover each taper region and to extend somewhat farther beyond it. As mentioned above, the tapers are preferably conformed for adiabatic coupling. Although adiabatically coupled vertical routing is known in other contexts, we believe we are the first to employ it for the purpose of suppressing interfacial reflections in a modulator.

Simulations of an example device have predicted reflective losses of about 1.5 dB per interface, yielding a total reflective loss of about 3 dB. With design improvements, we believe these losses can be reduced to 0.25 dB per interface, or even less.

As noted above, the upper waveguide must lie within an optical coupling distance of the LN film. The thickness of the cladding layer above the upper waveguide is denoted here by the symbol h. A useful range for values of h is 10-100 nm, and a typical value for h is 50 nm. In principle, h could be less than 10 nm, and could even be reduced to zero. However, an oxide thickness of at least 10 nm is helpful in facilitating the bond to the TFLN.

It is noteworthy in this regard that the performance of the device is not as sensitive to h as it is to other design parameters, which are discussed below, provided h is small enough to permit optical coupling into the LN.

The thickness of the LN layer is also less critical than other design parameters. However, if the LN layer is too thick, it is possible for optical slab modes to cause an unacceptable amount of optical loss by guiding captured light away from the modulation region.

On the other hand, the modulation efficiency will depend, in part, on how much of the coupled mode field is contained within the LN layer. Hence, the LN layer should be thick enough to contain enough of the mode field to yield an EO effect of the desired strength.

In examples, the TFLN thickness is 200 nm. More generally, a useful range for the TFLN thickness, by way of example, is 200-400 nm. As the operating wavelengths in our example implementation are near 1.5 μm, it will be understood that the TFLN thickness in our example implementation is sub-wavelength.

The lower SiN waveguides are designed to be single mode at the operating wavelengths, which in our example implementation are, as noted, near 1.5 µm. The upper SiN waveguides may also be designed to be single mode. However, a quasi-single-mode design is also believed acceptable for the upper waveguides. In such a design, the waveguide width is wide enough to support several modes above the fundamental. In operation, a single-mode signal adiabatically injected into such an upper waveguide would remain in a single mode.

Our example implementation of the OEM was a single-mode design. To operate it required the optical carrier to be injected in the TE-polarized fundamental guided mode of the lower waveguide.

In examples, the RF electrodes are situated 250-500 nm below the lower SiN waveguides. However, the device performance is not highly sensitive to this dimension. Thus, for example, the electrode-to-waveguide separation could be made significantly lower, even as low as 10 nm.

Figure 5A:
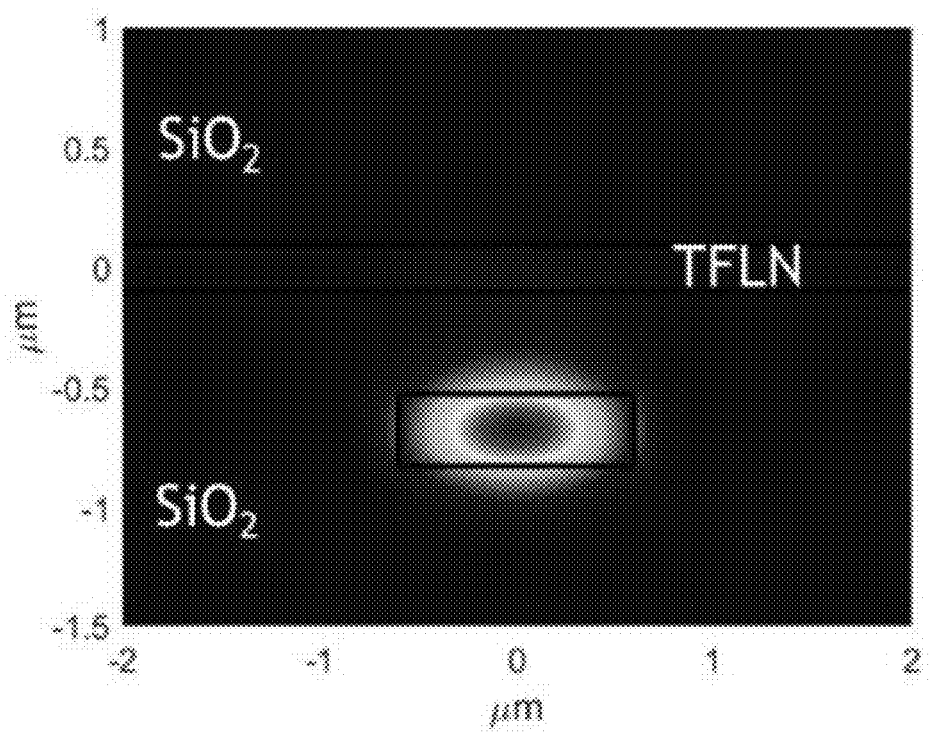
FIG. 5A is the graphical result of a simulation in which a silicon nitride (SiN) waveguide is optically uncoupled from a LN thin film.

FIG. 5A is the graphical result of a simulation in which a silicon nitride (SiN) waveguide has no substantial optical coupling to the LN thin film. Both the SiN waveguide and the LN film are embedded in silicon dioxide. Contours in the figure illustrate the spatial variation of the electric field intensity in the optical wave. In the example shown, the center-to-center distance between the SiN waveguide and the LN film is about 680 nm.

Figure 5B:
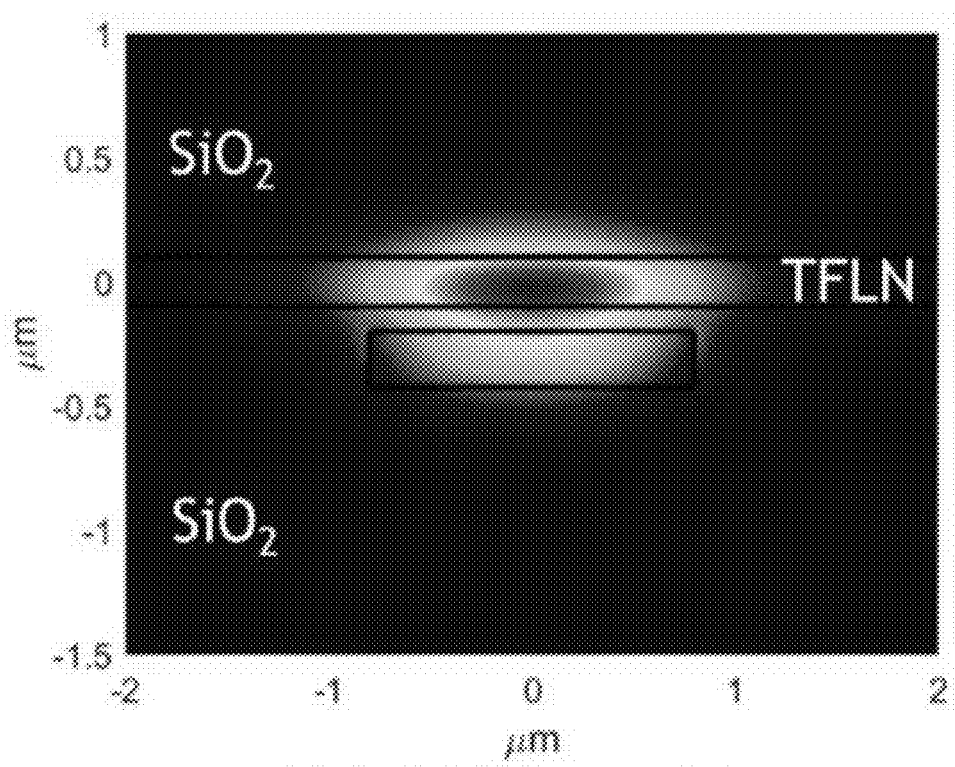
FIG. 5B is the graphical result of a simulation in which a silicon nitride (SiN) waveguide is optically coupled to a LN thin film.

FIG. 5B is the graphical result of a simulation in which a silicon nitride (SiN) waveguide is substantially coupled to the LN thin film. As in the preceding figure, the SiN waveguide and the LN film are embedded in silicon dioxide, and contours in the figure illustrate the spatial variation of the field intensity. In FIG. 5B, the center-to-center distance between the SiN waveguide and the LN film is about 280 nm. It will be apparent from the figure that the peak field amplitude now falls within the LN thin film.

The EOM of FIGS. 1-3 is a traveling wave device. That is, the optical carrier and the RF signal are both injected at the same end of the device, and both signals propagate in parallel from one end of the device to the other. The EO modulation effect is maximized when the RF signal and the optical signal co-propagate at the same velocity. In the device architecture described here, the respective velocities can be matched by choosing a suitable combination of values for the refractive indices of the optical waveguide media, the optical waveguide dimensions, the thickness of the LN thin film, and the metal RF waveguide dimensions. If, e.g., silicon were substituted for SiN as the waveguide material, or if a different EO material were substituted for LN, these dimensions would change accordingly.

Fabrication.

Figure 6:
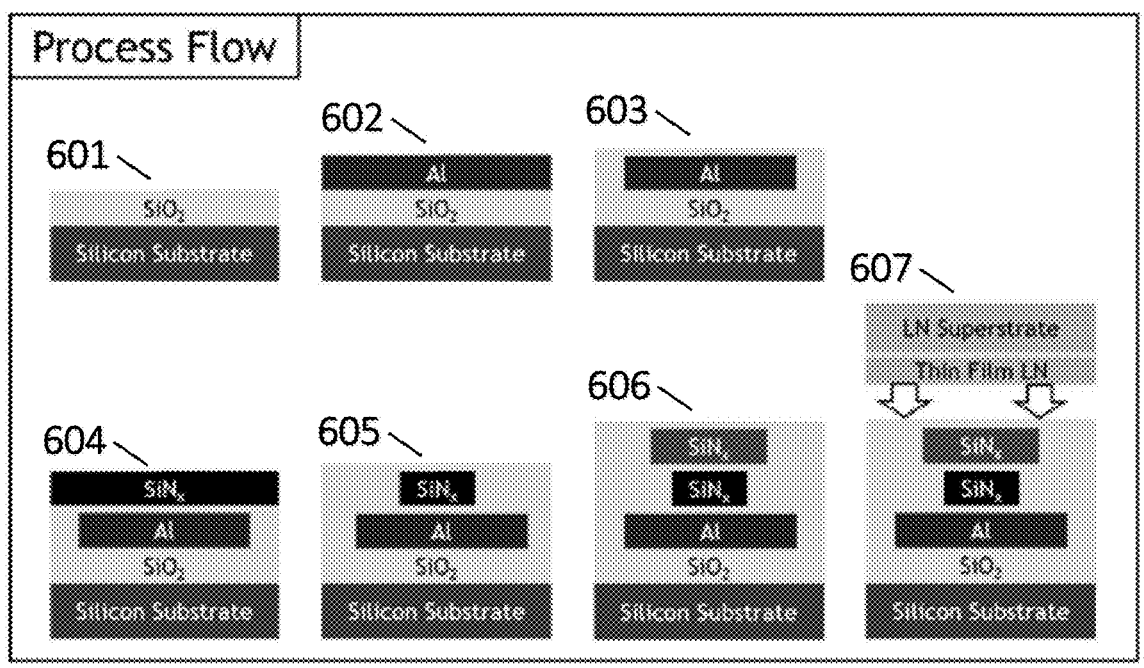
FIG. 6 is a sequence of views illustrating an example process for fabricating an OEM device of the kind described here.

In example OEMs, aluminum is chosen as the RF electrode material for compatibility with CMOS processes, and silicon nitride (SiN) is selected for the optical waveguide material. An example process sequence 601-607 for OEM fabrication is illustrated in FIG. 6.

At 601, we provide a high-resistivity (>1M-cm) silicon carrier wafer with a 3-µm top layer of thermally grown silicon dioxide. The high-resistivity wafer is desirable for reducing dielectric loss that would otherwise attenuate the RF mode.

At 602, aluminum RF electrodes are deposited. At 603, the aluminum electrodes are patterned and encased in silicon dioxide. At 604, a silicon-rich SiN film is deposited. An example film is 300 nm thick and has a material index of 2.11 at a wavelength of 1546 nm.

At 605, the SiN film is patterned to form the bottom optical waveguides, and then it encased in a silicon dioxide layer formed by high-density plasma deposition (HDP). This HDP oxide layer can be reduced in thickness by chemical-mechanical planarization (CMP) to improve coupling efficiencies between the top and bottom waveguide layers.

At 606, a second SiN film is deposited. An example film has a material index of 1.91 at 1546 nm. The SiN film is patterned to form the top optical waveguides. The nominal distance between the two SiN waveguide layers in an example device is 300 nm.

Then, a second layer of HDP silicon dioxide is deposited, and the resulting silicon dioxide surface is planarized by CMP. An optional hydrofluoric acid dip can be applied for final adjustment of the oxide thickness. We expect that minimizing this oxide thickness can improve the efficiency of the modulator by increasing the extent to which the guided mode expands beyond the SiN and resides partly within the TFLN. The planarized silicon dioxide top surface is the bonding surface for diced X-cut TFLN chips.

The TFLN bonding samples are diced from commercially obtained TFLN wafers. These wafers utilize a 500-µm-thick handle wafer consisting of X-cut lithium niobate with a 2-µm oxide layer and a nominal 200-nm-thick TFLN layer (also X-cut).

At 607, a TFLN die is bonded to the planarized silicon dioxide surface by a direct, oxide-to-oxide bond according to the following procedure:

In order to achieve quality bonds, the surfaces to be bonded must be very smooth. The bonding surface of the silicon photonic sample is planarized using CMP steps to have a root-mean square (RMS) roughness of less than 10 nm and that is nominally 6 nm. There are no polishing or planarization steps performed on the TFLN chips.

The two samples are cleaned using an SC1 clean ($H_2O$: $H_2O_2$:$NH_4OH$, 60:4:1 at 40° C. with a 75 W megasonic applied for 120 seconds), preceded and followed by a 60-second $O_2$ plasma activation. This process removes hydrocarbon particles while increasing silanol Si—OH group densities at the bonding surfaces, yielding a larger number of bonding sites.

Once each bonding surface is cleaned, the bond is initiated by pressing the two samples together with a force of 500 Newtons for twelve hours, while applying a thermal anneal of 50° C. to encourage covalent bonding.

Optionally, the carrier layers of the TFLN die can then be removed by deep reactive ion etching (DRIE), leaving behind only the thin LF film. That step is not shown in the figure. Removal of the carrier layers could possibly lead to better velocity matching between the RF and optical modes, thereby improving modulator performance.

Figure 7A:
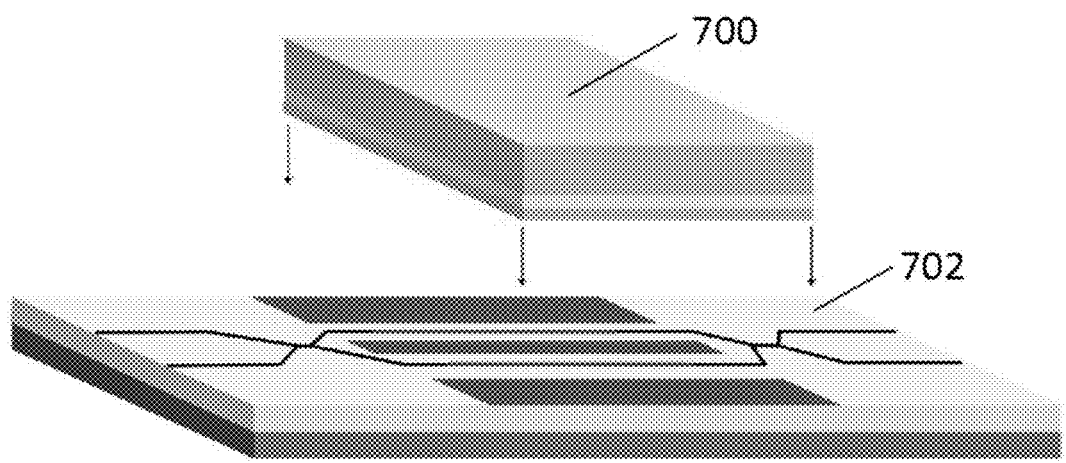
FIGS. 7A and 7B are notional, perspective views of, respectively, a process of bonding a chip bearing a lithium nitride thin-film layer to a SIP wafer, and the final, bonded assembly.
Figure 7B:
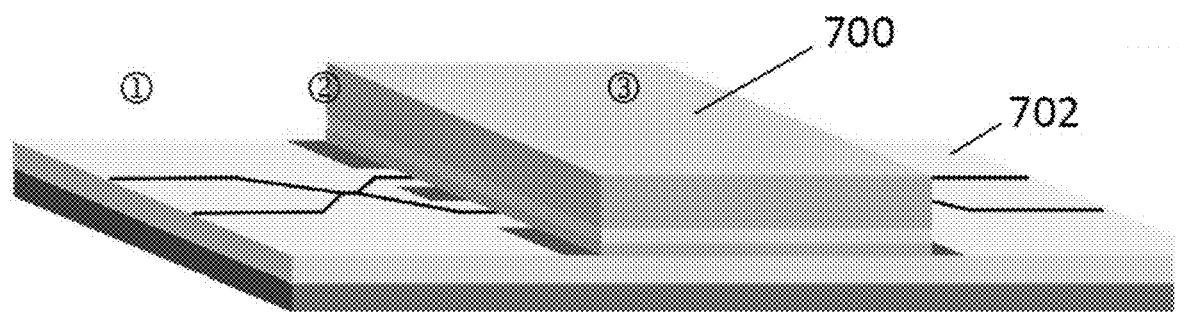

FIGS. 7A and 7B are notional, perspective views showing, respectively, the process of bonding the TFLN chip 700 to the SIP chip 702, and the final, bonded assembly.

Figure 8:
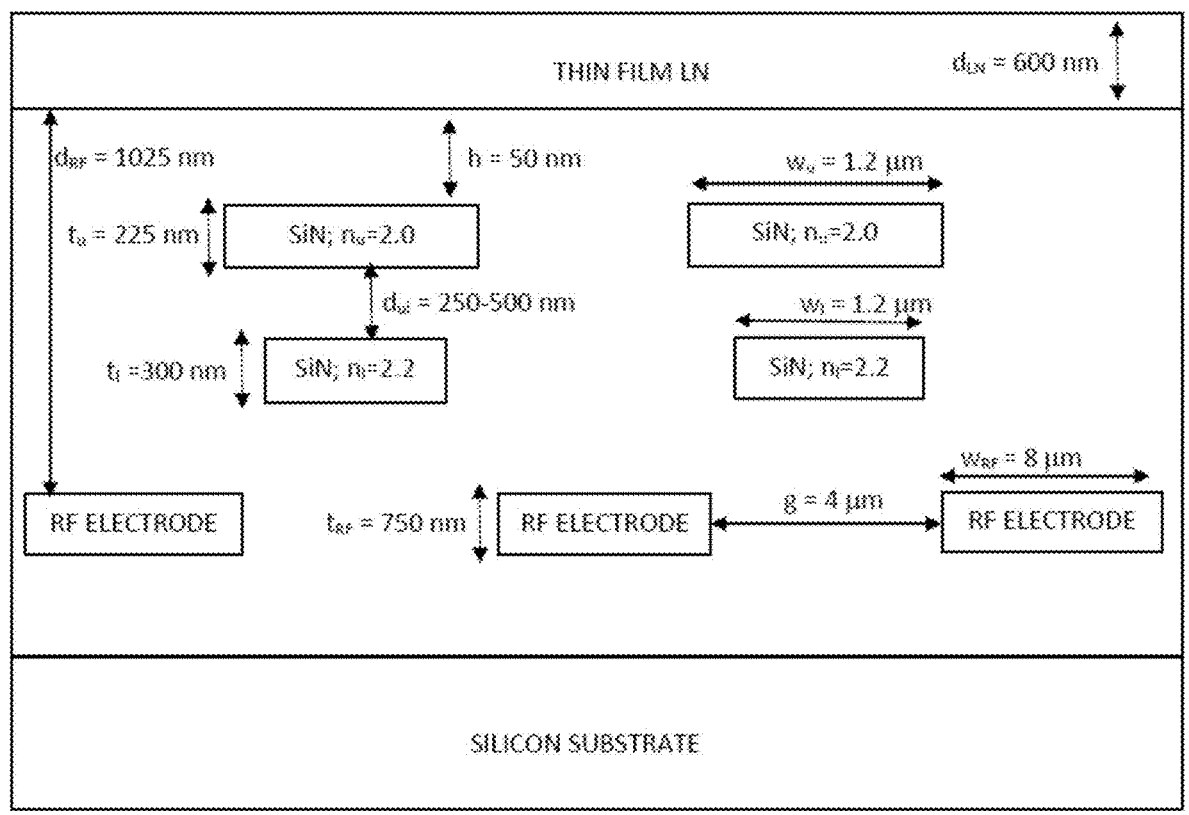
FIG. 8 is a simplified cross-sectional sketch, not to scale, showing some of the dimensions of the chip design in an example implementation of the OEM device described here.

FIG. 8 is a simplified cross-sectional sketch, not to scale, showing some of the dimensions of the chip design in an example implementation. The illustrated dimensions are summarized in Table 1. The listed values were selected to provide, among other things, velocity matching and an RF impedance of about 50 g.

TABLE 1

| Symbol | Meaning | Example Value |
|---|---|---|
| h | Silicon dioxide thickness between upper SiN waveguide and TFLN | 10-100 nm, typically 50 nm |

TABLE 1-continued

| Symbol | Meaning | Example Value |
|---|---|---|
| $w_u$ | Width of upper SiN waveguide | 1.2 µm, 1.6 µm |
| $w_l$ | Width of lower SiN waveguide | 1.2 µm (Generally, $w_l \leq w_u$) |
| $W_{RF}$ | Width of RF electrodes | Signal: 6 µm, 10 µm Ground: >100 µm |
| $t_u$ | Thickness of upper SiN waveguide | 225 nm |
| $t_l$ | Thickness of lower SiN waveguide | 300 nm |
| $t_{RF}$ | Thickness of RF electrodes | 750 nm |
| $d_{ul}$ | Silicon dioxide thickness between upper and lower SiN waveguides | 250-500 nm, typically 300 nm or 400 nm |
| $d_{RF}$ | Silicon dioxide thickness between RF electrodes and TFLN | 1.025 µm |
| $d_{LN}$ | Thickness of TFLN | 200 nm |
| g | Lateral gap distance between RF electrodes | 4 µm, 8 µm |
| $n_u$ | Refractive index of the upper SiN waveguide | Approx. 2.0 |
| $n_l$ | Refractive index of the lower SiN waveguide | Approx. 2.2 |

Example

We fabricated a prototype EOM as described above, with a modulation length of 0.5 cm. Two phase modulators were built into the arms of a Mach-Zehnder modulator (MZM) in a push-pull configuration to reduce the half-wave voltage, V. Each arm had a bottom layer of SiN waveguides, which routed the guided optical mode deep beneath the TFLN region to reduce optical loss to reflection at the air/TFLN interface. Each arm also had a top waveguide layer to support a guided mode residing partly in the TFLN and partly in the SiN.

Light was transferred between the top and bottom SiN waveguide layers via two overlaying 250-nm linear tapers having a minimum width of 0.2 µm and a maximum width of 1.2 µm. The top-layer waveguide tapered out farther, from 1.2 µm to 1.6 µm over a 100-µm distance.

Figure 9:
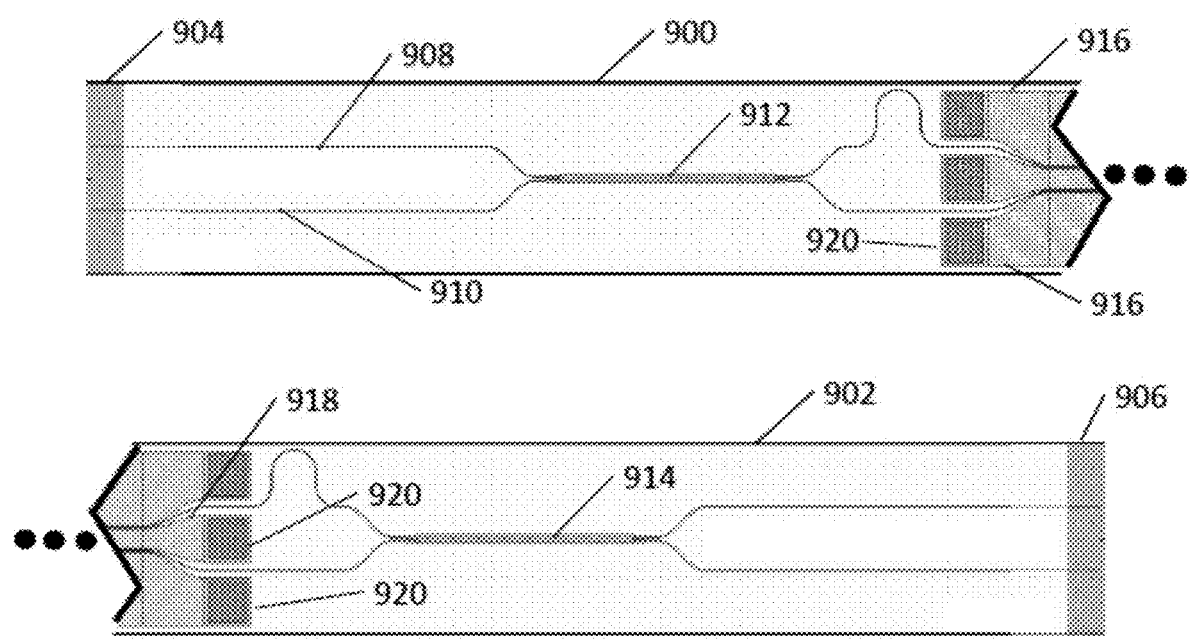
FIG. 9 is a plan view, approximately to scale, showing the layout of a Mach-Zehnder modulator arrangement in a prototype EOM device of the kind described here.

FIG. 9 is a plan view, approximately to scale, showing the layout of a Mach-Zehnder modulator (MZM) arrangement in a prototype EOM device of the kind described here. Input end portion 900 and output end portion 902 of the layout are shown, but the intervening middle portion of the layout has been omitted from the drawing so that scale can be preserved without sacrificing detail. Reference numerals 904 and 906 indicate the connection areas for input and output optical fibers, respectively. The MZM has two optical interferometer paths, identified by reference numerals 908 and 910, respectively. The layout includes an optical splitter 912 and an optical combiner 914. The radio-frequency electrode arrangement consists of ground electrode 916 and signal electrode 918 in a coplanar waveguide (CPW) arrangement. Vias (not shown) connect the electrodes to contact pads 920. The vertical optical couplings take place in respective transition zones that are not indicated in the drawing.

In our experimental prototype, multi-mode interference (MMI) devices were implemented in order to support broadband optical operation. Accordingly, we used 4-port MMI 3 dB couplers with dimensions of 330 µm×12 µm. We implemented waveguide tapers from 1.2 µm to 4 µm into the MMI slab to reduce optical loss.

The CPW had a gap ($G_{CPW}$) of 4 µm between the signal and ground traces with a signal trace width ($W_{CPW}$) of 6 µm.

Optical insertion loss in an experimental prototype MZM was estimated to be about 9.9 dB. To separately determine the optical loss of the phase modulation regions of the MZM, we also fabricated individual phase modulators. Their measured insertion loss at 1550 nm was 6.7 dB.

Simulations indicated that reflection at each air/TFLN interface was about 1.5 dB, giving a total of 3 dB of reflection loss. We attribute the rest of the insertion loss to propagation loss, the MMI couplers, and the coupling between fibers and waveguide tapers at the chip edges.

Figure 10:
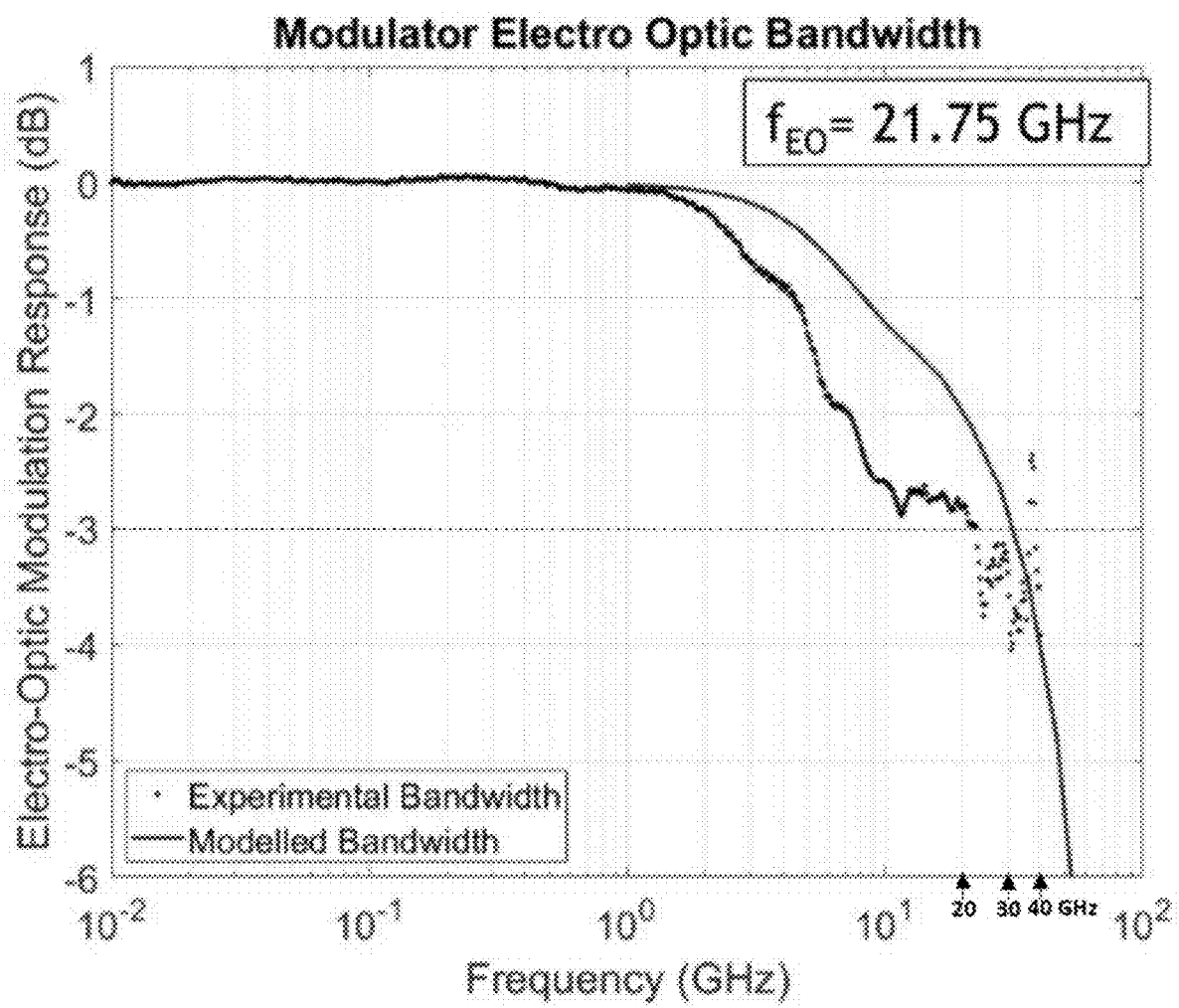
FIG. 10 is an experimental plot that characterizes a prototype EOM device by graphing its electro-optic modulation response $f_{EO}$ as a function of frequency. The solid curve is a theoretical curve produced by numerical simulation. Also plotted on the graph are experimentally measured data points.

FIG. 10 is an experimental plot that characterizes the prototype EOM by graphing its electro-optic modulation response $f_{EO}$ as a function of frequency. The solid curve is a theoretical curve produced by numerical simulation. Also plotted on the graph are experimentally measured data points. Inspection of the graph shows that the theoretically predicted 3-dB electro-optic bandwidth of the 0.5-cm-long modulator was 30 GHz, and that the measured bandwidth was 21.75 GHz. The measured $V_\pi L$ was 6.67 V-cm.

We claim:

1. An electro-optical modulator apparatus, comprising:
a substrate;
a cladding layer that overlies the substrate;
an EO modulation layer bonded to the cladding layer;
a modulation zone waveguide optically coupled to the EO modulation layer; and
an I/O waveguiding structure embedded in the cladding layer at a separation from the EO modulation layer such that the EO modulation layer is nearer to the modulation zone waveguide than it is to the I/O waveguiding structure, wherein:
the I/O waveguiding structure is optically coupled to the modulation zone waveguide; and
the I/O waveguiding structure is conformed to guide input light toward the modulation zone waveguide and to guide output light away from the modulation zone waveguide.

2. The apparatus of claim 1, wherein the modulation zone waveguide is a single-mode waveguide and the I/O waveguiding structure comprises at least one single-mode waveguide.

3. The apparatus of claim 1, wherein the modulation zone waveguide and the I/O waveguiding structure are included in an arm of a Mach-Zehnder modulator.

4. The apparatus of claim 1, further comprising radio-frequency electrodes that are electromagnetically coupled to the EO modulation layer.

5. The apparatus of claim 4, wherein the radio-frequency electrodes are traveling wave radio-frequency electrodes.

6. The apparatus of claim 4, wherein the radio-frequency electrodes are coplanar.

7. The apparatus of claim 4, wherein the radio-frequency electrodes are buried within the cladding layer.

8. The apparatus of claim 4, wherein the radio-frequency electrodes are buried within the cladding layer at a greater depth than the I/O waveguiding structure.

9. The apparatus of claim 1, wherein:
the substrate comprises a silicon or SOI wafer; and
the modulation zone waveguide and the I/O waveguiding structure are embedded in a cladding layer of silicon dioxide.

10. The apparatus of claim 1, wherein the I/O waveguiding structure has an input portion conformed to couple guided light into the modulation zone waveguide, and an output portion conformed to couple light out of the modulation zone waveguide.

11. The apparatus of claim 1, wherein the EO modulation layer comprises lithium niobate.

12. The apparatus of claim 1, wherein the EO modulation layer comprises thin film lithium niobate less than 1 μm in thickness.

13. The apparatus of claim 1, wherein the EO modulation layer is conformed as a layer less than one operating wavelength in thickness.

14. The apparatus of claim 1, wherein the I/O waveguiding structure comprises a waveguide with a tapered end for coupling guided light into the modulation zone waveguide.

15. The apparatus of claim 1, wherein the I/O waveguiding structure comprises a waveguide with a tapered end for coupling guided light out of the modulation zone waveguide.

16. The apparatus of claim 1, wherein the I/O waveguiding structure is situated more deeply within the cladding layer than the modulation zone waveguide, and the optical coupling between said structure and said waveguide is vertical optical coupling.

17. The apparatus of claim 1, wherein a silicon device layer is defined in the substrate.

18. The apparatus of claim 17, wherein one or more active electronic devices are defined in the silicon device layer.

19. The apparatus of claim 17, wherein one or more silicon photonic devices are defined in the silicon device layer.

20. The apparatus of claim 17, wherein the I/O waveguiding structure and the modulation zone waveguide comprise silicon nitride waveguides.

* * * * *